United States Patent [19]

Tateishi

[11] Patent Number: 5,669,007

[45] Date of Patent: Sep. 16, 1997

[54] METHOD AND SYSTEM FOR ANALYZING THE LOGICAL STRUCTURE OF A DOCUMENT

[75] Inventor: Yuka Tateishi, Machida, Japan

[73] Assignee: International Business Machines Corporation, Armonk, N.Y.

[21] Appl. No.: 395,559

[22] Filed: Feb. 28, 1995

[30] Foreign Application Priority Data

Jun. 16, 1994 [JP] Japan .................. 6-134014

[51] Int. Cl.$^6$ .................................. G06F 17/27
[52] U.S. Cl. .................. 395/779; 395/774; 395/776; 395/777
[58] Field of Search ............... 395/779, 761, 395/773–778, 784, 600, 800; 382/113, 173, 176, 180, 224, 240, 272, 276; 358/403, 453, 466

[56] References Cited

U.S. PATENT DOCUMENTS 5,438,512  8/1995  Mantha et al. ................ 395/145
5,454,102  9/1995  Tang et al. .................... 395/600
5,555,362  9/1996  Yamashita et al. ............. 395/145

*Primary Examiner*—Almis R. Jankus
*Attorney, Agent, or Firm*—Stephen C. Kaufman

[57] ABSTRACT

An input document is matched with predetermined patterns on a line-by-line basis, whereby it can be assigned a plurality of pairs of attributes and costs. When the process for the whole document is completed, in accordance with a rule specifying the combination of attributes between the adjacent lines, the nodes of a graph are generated, the nodes are linked with each other, and costs are given to the node and links. There is a plurality of paths for traveling the graph from the root node to the final node, and each of them means the interpretation of a possible logical structure of the document. By summing the costs for the traveled nodes and links, a total cost value can be associated with each path, and by prioritizing by this total cost value, a plurality of logical structure interpretations can be sequentially shown from the most plausible path (logical structure interpretation). A chosen logical structure is tagged as required.

20 Claims, 12 Drawing Sheets

Logical structure understanding by structural characteristics matching

Fig. 11

Chapter 12. Magnificaiton and Reduction

Sometimes it may be desired to make a particlular content larger or smaller than an ordinary printing type.
On equipment supporting types of a plurality of sizes, BookMaster allows this in the following cases:

- For decoration characters in a list with a number and a list without a number, it is performed using DBSCALE attribute of OK, NOTEL, and UL tags.
- For the following, it is performed using a SCALE attribute:
    - Drawing
    - Figure
    - Table
    - Example
    - Interaction
    - Directory
    - List of messages and codes
    - Parts list
    - Numeric expression displayed
    - Character graphic This chapter discuses general matters corresponding to all the above cases for the magnification and reduction of items.
This process is called "scaling," and a value specified for its attribute is called a "scaling coefficient."

In BookMaster, the point size of the usually used in the context for the document elements is mulpoied by a scaling coefficient. Then, using the results of the calculation, the closest point size is selected from the available ones of the fonts.

If a scaling coefficient smaller than 1 (for instance, .8) is specified, the type to be used is small (it is assumed that small fonts can be used). For instance, if .8 is used as the scaling coefficient when the ordinary font is 10 points, the result is 8 points (if a font of 8 points is available). If specified to be smaller than the smallest available font, that smallest font is used.

If a scaling coefficient larger than 1(for instance, 1.2) is specified, the type becomes larger, for instance, form 10 points to 12 points.

If 3 is used as the scaling coefficient, the type size depends on the output device. In the device in which the maximum point size is 24, a type of 24 points is used. Further, in the device in which the point size is allowed up to 36 points, a type of 36 points is used. Although the actual calculation result of the scaling is 30 points (it is assumed that the ordinary font is 10 points), a type of 36 points is the closest size which BookMaster can use (if font of 30 points is available).

If a WIDTH attribute is included in a graphic or example, the value of AUTO can be used as a SCALE value, for instance, as follows:
    :Xmpwidth=80scale=auto.

In this way, the content of this example is "automatically" scaled so that the text of a 80-character width is accommodated in one line of a specified paragraph width and thus the work for calculating what scaling coefficient to use can be reduced. For AUTO, only reduction is performed, and magnification to shorten the spacing is not performed.

Fig. 12

:h1. Chapter 12. Magnification and Reduction

:p.
Sometimes it may be desired to make a particular content larger or smaller than an ordinary printing type. On equipment supporting types of a plurality of sizes, BookMaster allows this in the following cases:

:ul.

:li.For decoration characters in a list with a number and a list without a number, it is performed using a DBSCALE attribute of OL, NOTEL, and UL tags.

:li.For the following, it is performed using a SCALE attribute:

:ul.

:li.Drawing

:li.Figure

:li.Table

:li.Example

:li.Interaction

:li.Directory

:li.List of messages and codes

:li.Part list

:li.Numeric expression displayed

:li.Character graphic

:eul.

:eul.

This chapter discusses general matters corresponding to all the above cases for the magnification and reduction of items. This process is called "scaling," and a value specified for its attribute is called a "scaling coefficient."

:p.
In BookMaster, the point size of the type usually used in the context for the document elements is multiplied by a scaling coefficient. Then, using the result of the calculation, the closest point size is selected from the available ones of the fonts.

:p.
If a scaling coefficient smaller than 1 (for instance, .8) is specified, the type to be used is small (it is assumed that small fonts can be used). For instance, if .8 is used as the scaling coefficient when the ordinary font is 10 points, the result is 8 points (if a font of 8 points is available). If specified to be smaller than the smallest available font, that smallest font is used.

:p.
If a scaling coefficient larger than 1 (for instance, 1.2) is specified, the type becomes larger, for instance, from 10 points to 12 points.

:p.
If 3 is used as the scaling coefficient, the type size depends on the output device. In the device in which the maximum point size is 24, a type of 24 points is use. Further, in the device in which the point size is allowed up to 36 points, a type of 36 points is used. Although the actual calculation result of the scaling is 30 points (it is assumed that the ordinary font is 10 points), a type of 36 points is the closest size which BookMaster can use (if font of 30 points is available).

:p.
If a WIDTH attribute is included in a graphic or example, the value of AUTO can be used as a SCALE value, for instance, as follows:

:p.
:Xmp width=80 scale=auto

:p.
In this way, the content of this example is "automatically" scaled so that the text of a 80-character width is accommodated in one line of a specified paragraph width and thus the work for calculating what scaling coefficient to use can be reduced. For AUTO, only reduction is performed, and magnification to shorten the spacing is not performed.

METHOD AND SYSTEM FOR ANALYZING THE LOGICAL STRUCTURE OF A DOCUMENT

FIELD OF THE INVENTION

The present invention is related to a method and system for analyzing the logical structure of a document read by an optical character reader, for instance, and converted to a text file format, and automatically giving tags such as TeX or BookMaster (a trademark of IBM) as required.

BACKGROUND OF THE INVENTION

In recent years, attempts have been made to convert a document printed on paper to an electronic form for various applications. The objects of converting a document to an electronic form include facilitating information retrieval in the document and facilitating layout design in printing.

To extract information from a document converted to an electronic form, it is necessary to describe at least bibliographical information (such as the title and author's name), and, to allow for further flexible retrieval, it is necessary to describe a header indicating a chapter or paragraph, correspondence between a figure and a sentence, a list structure, etc. In other words, the logical relationships of a document must be extracted and tags for identifying them (as standard ones, for example, tags described in GML, ISO/ISC 8879, and Standard Generalized Markup Language (1986)) must be added.

Further, to facilitate a layout change in printing, it is necessary to abstract format information and add it to the document. The format of a document is closely related to the logical structure of the document, and, in general, a document is prepared which is provided with the tags of a format control language reflecting the logical structure (such as TeX, and the above described GML can be deemed to be such a one) and interpreted for printing.

In recent years, on the one hand, word processors and the like are generally used to create a document, but the conventional work of converting a document existing only on paper to an electronic form, including the logical structure, thereof has been done manually.

On the other hand, with the progress in the techniques for converting the character information contained in an image to a machine-readable form, in other words, the technology used by an optical character recognition (OCR) system), OCR systems are beginning to be used as an input device for information accumulated in paper form (Trans. IEICE (The Transactions of the Institute of Electronics, Information and Communication Engineers): Report on the Investigation and Research of the Standardization of Office Automation Equipment Related to Information Processing Systems, 1993). Many of them extract character strings from a scanned image, and divide them into images on a character-by-character basis and make them recognizable in the form of output character codes (strings), and, in general, other information possessed by a document image (e.g., the position of the character line and font information) is abstracted.

Thus, studies have been made for enabling various information possessed by a document image to be extracted by an OCR (for example, Yamashita and Amano: A Model Based Layout Understanding Method for Document Images, Trans. IEICE (D-II), Vol. J75-DII, No. 10, pp. 1673-1681, 1992, and Patent Application Laid-Open No. 4-278634 official gazette). According to these disclosed techniques, after the various components of a document image (such as figures, tables, and character lines) are separated based on various characteristics (run length, marginal distribution, and linking of black pixels), their positional relationships, that is, the layout structure (such as column arrangement) is interpreted. However, since a document image essentially includes ambiguity, sometimes it may be difficult to be interpreted uniquely.

However, although layout information reflects the logical structure to some degree, it is not the logical structure itself. For instance, the same document can be printed with a difficult column arrangement, which causes layout information to change, even though the logical structure is maintained. That is, here the logical structure means paragraphs, itemized lists, and reference relationships between figures, tables and texts, and they cannot be determined from layout information.

As the approaches to the understanding of the logical structure of such a document, the following two were proposed:

(1) Labeling is performed based on the keywords unique to each component from a sold document, and a logical structure such as a chapter or paragraph in accordance with the grammar (document structure grammar) which each predefined label should satisfy (Doi et al.: Development of Document Architecture Extraction, Trans. IEICE (D-II), Vol. J76-D-II, No. 9, pp. 2042-2052, 1993).

(2) Matching blocks whose elements are basic rectangles extracted from a document image and their attribute values with those of a registered document model (which describes the logical elements of a document and the layout characteristics that they have), determining a logical structure from the selected model (Yamada: Conversion Method from Document Image to Logically Structured Document Based on ODA, Trans. IEICE (D-II), Vol. J76-D-II, pp. 2274-2284, 1993).

(1) is characterized in that it does not particularly assume the understanding of a document image. (1) consists of a format analyzing section which performs labeling representing character strings from symbols and words unique to heading (such as "Chapter 1" and "Introduction"), and a intersentence structure analyzing section which analyzes a label string using a stack automation in accordance with the document structure grammar. For instance, taking the text "1. Introduction" as an example, it is labeled as these elements in the format analyzing section as shown in FIG. 1, and by the parsing performed by the intersentence structure analyzing section, it is determined to be a header representing "Chapter 1." Doi et al. (Doi et al.: Development of Document Architecture Extraction, Trans. IEICE (D-II), Vol. J76-D-II, No. 9, pp. 2042-2052, 1993), for further dealing with the misallocation of numerals and symbols, added a process in which the degree of matching between the label sequence whose structure has not yet been determined and the label pattern currently on the stack is defined, and, if that value is within a threshold value, the depth is the same as the current depth, and, if that value exceeds the threshold value, a new heading or list is made which is deeper than the current depth by one, but only one interpretations may be allowed for each step of the process. That is, the label sequence is uniquely interpreted when put on the stack. This approach is to describe the logical structure of a document by using a context-free grammar (CFG) and may deal with various documents flexibly. However, it is difficult to apply this to the result of a document image understanding system. The reason for this is that, when the layout and the various characteristics in the text format obtained from a document image are converted to a logical structure, they cannot always be uniquely interpreted in each step of the process. On the contrary, there are many ambiguities which are not solved unless many other characteristics are taken into consideration, and in intermediate stages, more than one interpretation must be retained.

(2) assumes a document image input, and, in this sense, it is an approach assuming that input information (in this case, the block extracted from the image and its attributes) has an equivocation (FIG. 2). First, basic rectangles, the smallest units of the image components, are extracted, and continuous rectangles having the same attribute are grouped into a block. The attributes proposed by this include line spacing, character spacing, and the left offset value (identification of left justification, centering, and the like). The extracted blocks are further grouped into a block called 'content' taking account of the logical boundary by an analysis of the section number, column extraction, and the like. After determining the document class by matching the content with those of the pre-determined class models, a logical structure is generated in accordance with the rule defined in the document class. The ambiguity in image interpretation is absorbed in the step of matching, but, after the determination of a document class, a logical structure is uniquely generated in accordance with the rule of that class (which can be considered to be a grammar for generating a logical structure) and the local ambiguity would be abstracted. In addition, in order to describe logical structures for individual document classes beforehand, an another class must be defined even if only one of the characteristics is different, and thus a problem remains in versatility (in other words, the descriptive power) compared to that of a document structure grammar such as that used in the approach in (1).

Further, the Patent Application Laid-Open No. 3-142563 official gazette, in a method for inputting a natural language, analyzing it by a modification candidate detector to generate a paragraph node list with modification candidates, and analyzing the paragraph node list by interaction with a user, discloses a technique wherein, if there is ambiguity in the node modification, the ambiguous portion and the value of the scores of the equivocal candidates are displayed, thereby allowing the operator to sequentially select the desired candidates. However, the Patent Application Laid-Open No. 3-142563 official gazette is basically on an interaction basis and is not extendable so as to automatically perform the whole process by computer control, and also discloses nothing about an extension to generally analyze the logical structure of a document while allowing ambiguity, except for the detection of modification candidates.

SUMMARY OF THE INVENTION

Accordingly, an object of the present invention is to provide a method and system for enabling the logical structure of documents to be totally determined while allowing ambiguity.

A further object of the present invention is to provide a method and system for automatically analyzing the logical structure of documents in the framework of a stochastic grammar by computer control.

A still further object of the present invention is to provide a method and system for automatically giving tags such as BookMaster or TeX in accordance with the logical structure of a document analyzed in such a way.

Generally, the logical structure of a document characterized by various kinds of characteristics such as the section number and the offset from the page boundary in addition to local information such as specific keywords, punctuation, and the indent in a block. The requirements of an approach to extract the logical structure of a document are as follows:

(A) To determine the logical structure from more than one characteristics which may be ambiguous.

(B) To enable the output of more than one of interpretations in the order of their preference as needed if ambiguity remains.

(C) To have a high descriptive power in relation to the logical structure of a document.

However, the conventional approach could not satisfy all of these requirements at the same time. That is, it is very difficult for the above described approach (1) to satisfy the requirements of (A) and (B), and the above described approach (2) lacks the requirements of (B) and (C).

A generative grammar can easily be a framework for describing the logical structure of a document. The reason is that it can describe global structural constraints in terms of local structures (the above-described requirement (C)). The approach (1) satisfies the above requirement (C) by using a context-free grammar for describing the logical structure.

However, if there are ambiguities in the obtained characteristics, a deterministic parser such as the stack automaton used in the above described approach (1) is difficult to perform a further analysis while ordering more than one candidates of interpretations.

Thus, the present inventor paid attention to the technique using a stochastic grammar employed in speech recognition and the like. That is, in the field of postprocessing of speech recognition and the like, is proposed the application of a stochastic grammar provided with a conditional probability in which one nonterminal symbol is rewritten as the array of a terminal symbol and a nonterminal symbol on the right side, and an active chart parsing grammar has been studied (H. Thompson: Best-first enumeration of paths through a lattice—an active chart parsing solution, Computer Speech and Language, No. 4, pp. 263–274, 1990).

The object of the present invention is to provide a method and system wherein the logical structure of a document is described in the framework of the stochastic grammar, and extraction of the logical structure of the document is replaced by an analysis graph search problem, thereby to simultaneously satisfy the above described requirements of (A), (B), and (C). The method of the present invention comprises the following respective steps:

(a) Reading a document to the buffer memory of a computer system on a line-by-line basis.

(b) Determining the attribute of the line read to the buffer memory in accordance with a predetermined line attribute determination criterion to assign one or more attribute candidates and associate with each candidate a cost value representing a measure for its plausibility.

(c) In response to completion of the attribute determination for all of the lines of the document, generating a starting node and then, for the first line of the document, generating as many nodes as the number of attribute determinations of the first line, and, in accordance with a predetermined attribute-based node linking rule, linking the starting node with the nodes generated for the first line.

(d) For the next line, generating as many nodes as the number of attribute determinations of the next line and in accordance with the predetermined attribute-based node linking rule, linking the nodes generated for the line preceding the next line with the nodes generated for the next line.

(e) Sequentially performing the step (d) until reaching the last line to construct a directed graph from the starting node to the ending node.

(f) Traversing the directed graph from the starting node while summing the costs for the nodes en route find the n (≧1) paths whose costs are smaller than the others reaching the ending node.

(g) Individually displaying the sum of the costs associated with the paths found.

Another aspect of the present invention further comprises a step for allowing the operator to select one or more valid paths based on the displayed costs, and giving tags such as BookMaster or TeX based on the selected path.

In accordance with the present invention, a computer system implementing the above described method is provided which has the following construction:

(a) A memory means connected to the computer system and storing a document to be analyzed for the logical structure thereof.

(b) A means for reading the document from the memory means to a buffer memory of the computer system on a line-by-line basis.

(c) A means for determining the attribute of the line read to the buffer memory in accordance with a predetermined line attribute determination criterion to allow for determining one or more attributes and associate with each attribute a cost representing a measure for the validity of the determination.

(d) A means responsive to the completion of the attribute determination for all of the lines of the document for generating a starting node and then, for the first line of the document, generating as many nodes as the number of the attribute determinations of the first line, and, in accordance with a predetermined attribute-based node linking rule, linking the starting node with the nodes generated for the first line.

(e) A means for generating for the next line as many nodes as the number of attribute determinations of the next line and, in accordance with the predetermined attribute-based node linking rule, linking the nodes generated for the line preceding the next line with the nodes generated for the next line.

(f) A means responsive to the completion of the process until reaching the last line of the document for constructing a directed graph directed from the starting node to the ending node.

(g) A means for traveling the directed graph from the starting node while summing the costs for the nodes en route to find one or more paths reaching the ending node.

(h) A means for individually displaying the sum of the costs associated with one or more paths found.

Another aspect of the present invention further comprises a means for allowing the operator to select one or more valid paths based on the displayed costs, and giving tags such as BookMaster or TeX based on the selected path.

BRIEF DESCRIPTION OF THE DRAWINGS

FIG. 11 is a diagram showing an example of the document input to the image analyzing section 302 in FIG. 3;

FIG. 12 is a diagram showing the tagging by BookMaster based on the result of a logical structure analysis applied to the document in FIG. 11 by the process of the present invention.

DETAILED DESCRIPTION OF THE INVENTION

Figure 1:
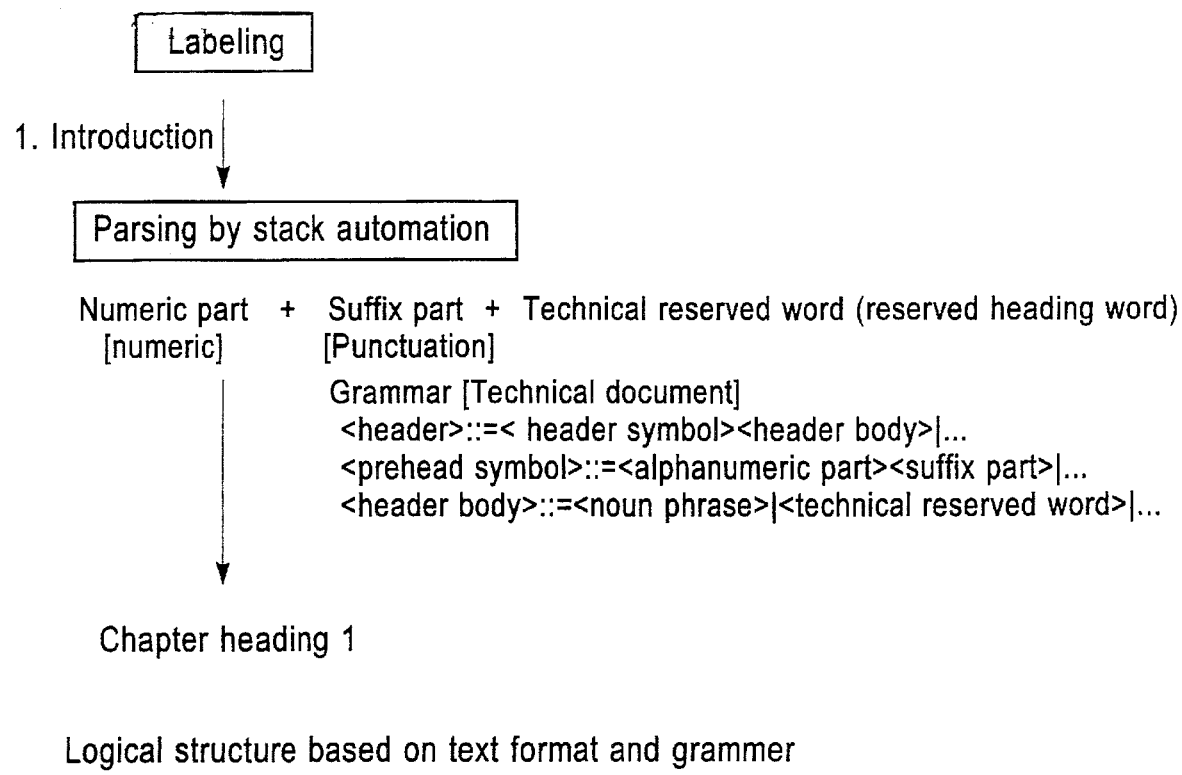
FIG. 1 is a diagram showing a prior art technique of logical structure understanding based on a text format and grammar.
Figure 2:
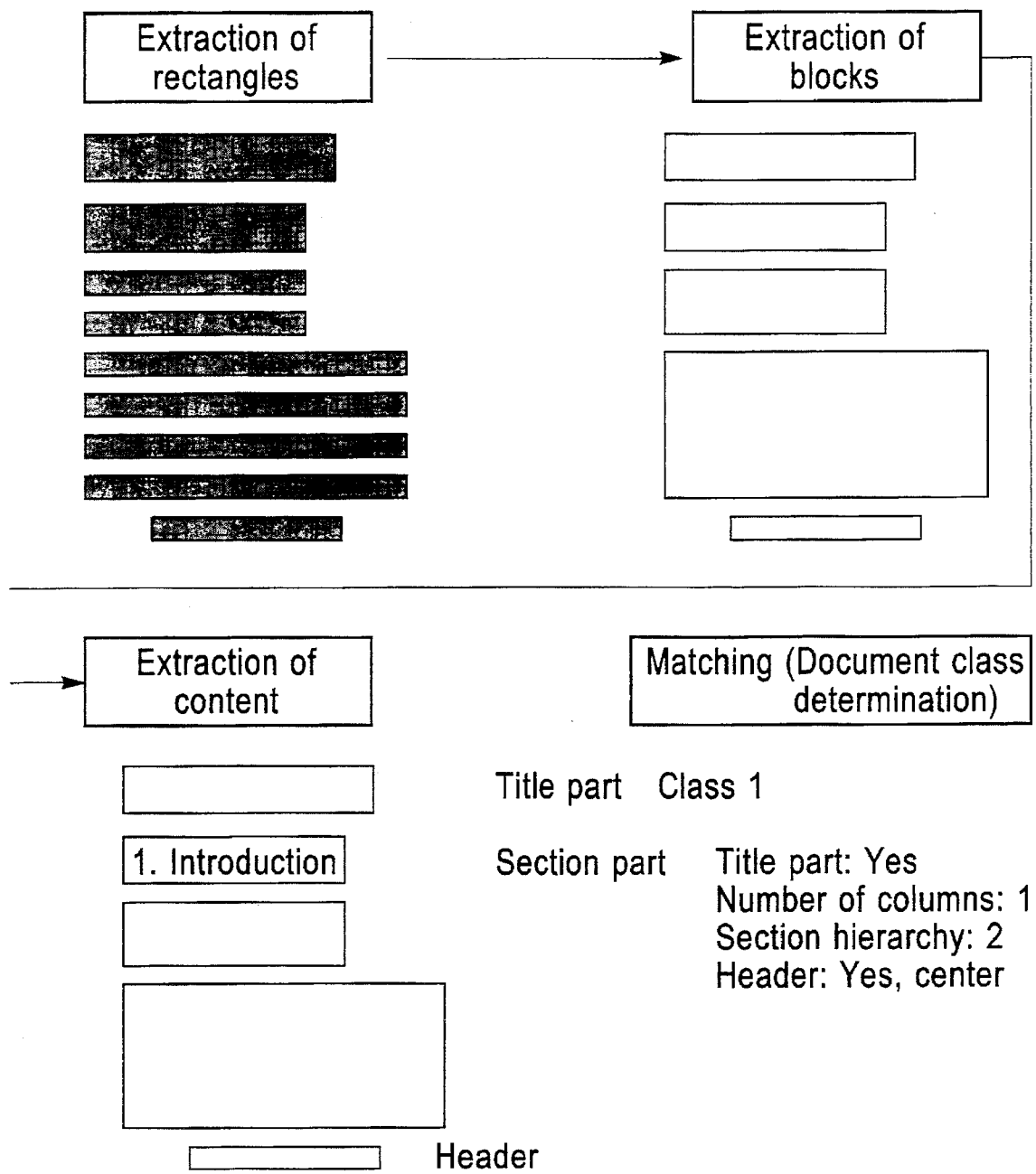
FIG. 2 is a diagram showing a prior art technique of logical structure understanding by structural characteristic matching.
Figure 3:
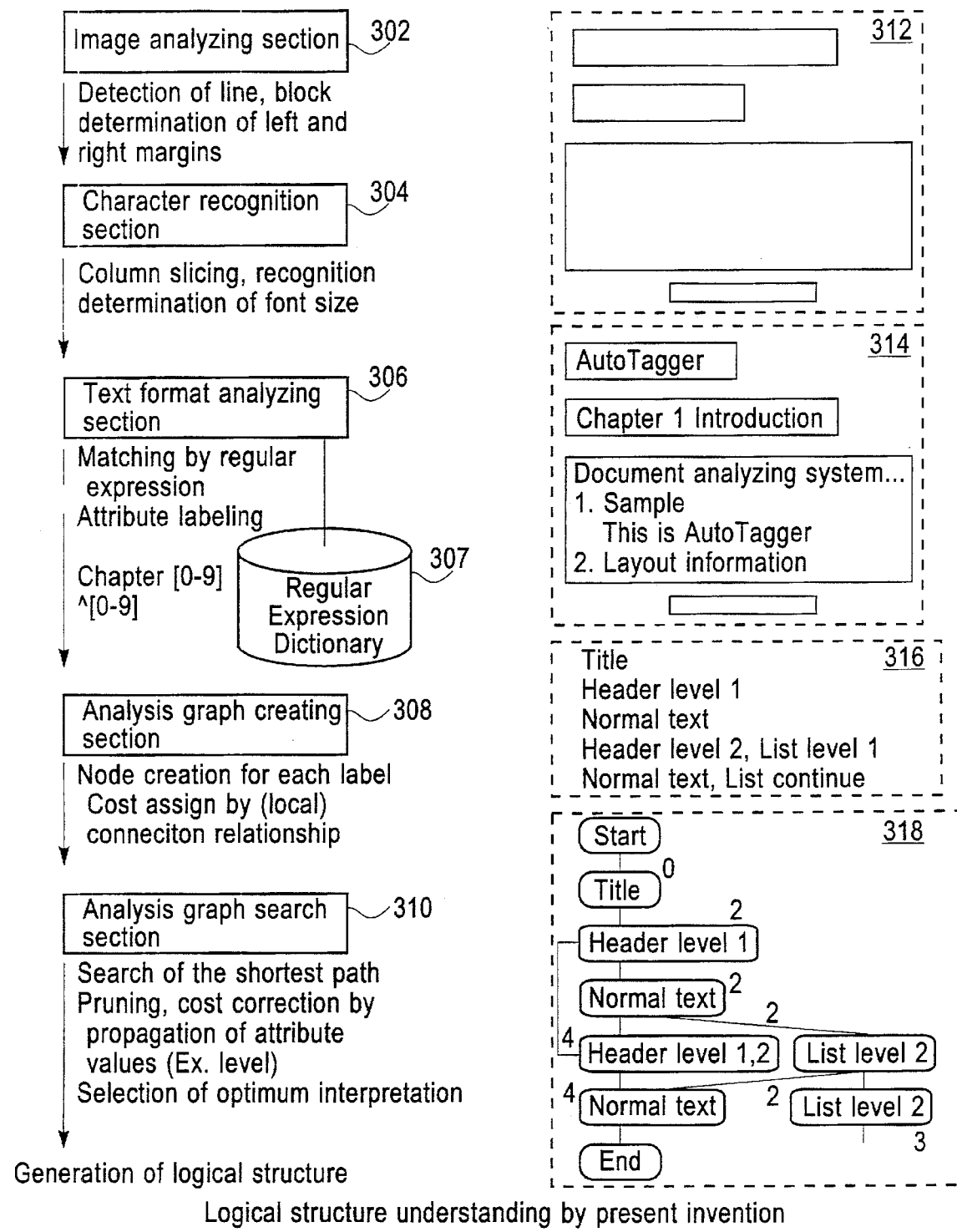
FIG. 3 is a diagram showing the general flow of the process for logical structure understanding according to the present invention, and data formed by each processing thereof.

Referring to FIG. 3, a system related to a preferred embodiment of the present invention logically comprises five subsystems consisting of an image analyzing section 302, a character recognition section 304, a text format analyzing section 306, an analysis graph creating section 308, and an analysis graph searching section 310. However, the main portions of the present invention are the three subsystems, the text format analyzing section 306, the analysis graph creating section 308, and the analysis graph searching section 310 in FIG. 3 rather than a document recognition technique such as OCR. Accordingly, the document to be analyzed for the logical structure thereof by the present invention is not limited to a text file converted from the content printed on paper by OCR, but a text with no text tags which is input through a keyboard or created by a text editor running on a personal computer, which is the input to the text format analyzing section, is also allowed.

The image analyzing section 302 includes an image scanner (not shown in FIG. 3) for scanning paper on which a document is printed to generate an image file containing a document image, and has the function of segmenting the document image into character strings and figures as shown in the region 312 surrounded by a frame, and, grouping character strings, based on the line spacing, the left offset value and the like, to create a block.

The character recognition section 304 has the function of performing the column segmentation of a portion determined to be a character string, and recognizing and converting it to a character code stream, as shown in the region 314 surrounded by a frame. Simultaneously, the determination of the font size and the detection of the base left margin and base right margin are performed at this stage.

The text format analyzing section 306 has the function of extracting a particular character string pattern by using a regular expression defined in a dictionary 300 preferably stored on a hard disk, and, for each character line, performing the labeling of attributes representing a logical structure as shown in a region 316 surrounded by a frame. The label mentioned here is not the format itself used in the above described approach (1), but it is an attribute closer to a logical structure element and associated with a value of cost. The introduction of the cost and the creation and searching of an analysis graph are the basic idea of the present invention. It should be noted that a plurality of labels can be attached to one line. An example of such labels is shown in the region 316 surrounded by a frame. That is, in the region 316, an attribute called "Title" is assigned to the first line, and this means that the first line has been recognized to be a title. An attribute called "Header level 1" is assigned to the second line, and this means that the second line has been recognized to be a header of level 1. To the third line, an attribute called "Normal text" is assigned, and this shows that the third line has been recognized to be an ordinary text line (not title or list). Two attributes called "Header level 2" and "List level 1" are assigned to the fourth line, and this means that the fourth line has been recognized to be a header of level 2 and a list of level 1. Two attributes called "Normal text" and "List continue" are assigned to the fifth line, and this means that the fifth line has been recognized to be an ordinary text line and a continuation of list.

If, in the above described approach (1), ambiguous grammars are written, more than one interpretation occurs at that stage. However, the problem with the above described approach (1) lies in the point that the parsing mechanism in (1) always choose just one interpretation, and no information on the plausibility of the interpretation is supplied. The cost introduced in the present invention is to represent plausibility or validity of each of the interpretations.

The analysis graph creating section 308 uses the attributes assigned in the text format analyzing section 306 as nodes, and creates a graph in which a link is the relationship of their associated lines being adjacent. On this graph, one path from the starting point to the ending point corresponds to one of interpretations of the logical structure of a document.

The analysis graph search section 310 calculates the cost of each path on the graph created in the previous stage, and orders the paths by cost. In this stage, the technique of traveling a graph with costs to seek and display solutions described in the Patent Application Laid-Open No. 5-46590 official gazette and the like may be used.

Figure 4:
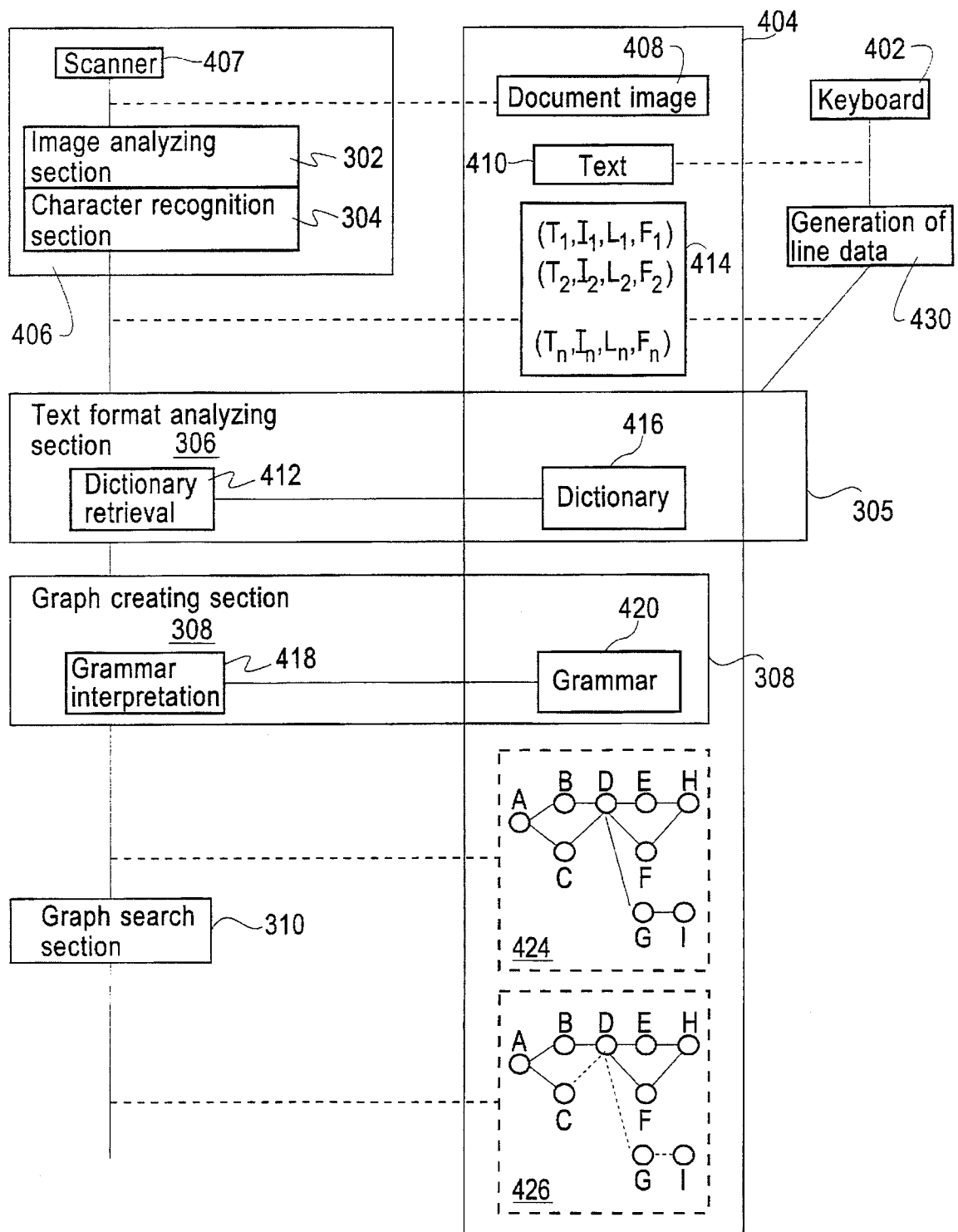
FIG. 4 is a diagram showing a hardware configuration, and the relationships between it and each structural element in FIG. 3.

Referring now to FIG. 4, the concrete construction of the system of the present invention is described. The system of FIG. 4, from the point of the hardware configuration, is a common configuration comprising a main memory (not shown) which is, for instance, a volatile random access memory, a CPU (not shown) performing arithmetic processing, a keyboard 402, a hard disk unit 404, and an OCR system 406. The OCR system 406 consists of an image scanner 407, an image analyzing section 302, and a character recognition section 304. Note that, to show the same structural element as FIG. 3 in FIG. 4, the same reference numeral is used. The image analyzing section 302 and the character recognition section 304 constituting the OCR system are in fact a program module stored on the hard disk 404, and, for instance, it is read from the hard disk 404 into main memory when the system starts up, and performs under the control of the CPU processing such as driving of the scanner 407, creation of a document image file 408 and its storage onto the hard disk 404, analysis of the document image file 408 and layout slicing, and creation of a text file 410 by character recognition from the layout sliced out.

Since the image analyzing section 302 has substantially the same function as the extraction of rectangles and blocks in the above described approach (2) although it uses a different algorithm, the description thereof is omitted. For further details, reference is made to (Yamashita and Amano: A Model Based Layout Understanding Method for Document Images, Trans. IEICE (D-II), Vol. J75-D-II, No. 10, pp. 1673–1681, 1992) and the Patent Application Laid-Open No. 4-278634 official gazette.

In the character recognition section 304, the portion determined to be a text in the image analyzing section 302 is converted to a four-element string of <character string, left end position, line length, font size>. In addition, the default left end, line length, and font size are defined as follows, for instance:

Left end: The leftmost position of the point that the left end of 80% of the lines of the whole document is positioned to the right of this position.

Line length: The minimum value of the point that the line length of 80% of the whole document is a smaller value than this.

Font size: The most frequent value of the font size.

The character recognition section 304 saves the above described four-element data converted in this way to the hard disk 404 as line data 414 for each line. In addition, the character recognition section 304 recognizes the end of one line when the right end of the recognized character string is reached.

A text 410 stored on the hard disk 404 is a file which saves text data input by the keyboard 402 or prepared by using a text editor or a word processor, or converted by the OCR 406.

A line data generating and processing section 430 reads the text 410 stored on the hard disk 404 on a line-by-line basis, calculates the left end and right end positions and the line length of each line of the text therein, and thereafter creates the above described four-element set, with the font size being fixed. Further, the default left end, line length, and font size are determined as described above. In addition, the line data generating and processing section 430 recognizes the end of one line when it encounters the CR•LF code (OxOdOa) of a file.

The result of this processing is also stored on the hard disk 404 as line data 414. That is, line data 414 may be created by the character recognition section 304 of the OCR unit 406, or may be created by the line data generating and processing section 430 through the processing of the text file 410.

The text format analyzing section 306 has a dictionary 416 for format analysis stored on the hard disk 404, and a dictionary retrieval section 412 resident in main memory, and functions to input the above described four-element data for each line from the line data file 414 stored on the hard disk 404 and to assign a label representing a logical attribute to each line of the text.

The dictionary 416 describes the correspondence between character strings (such as "Chapter 1" representing the header of a chapter) which can be the keywords of the logical structure of a document and combinations of attributes representing the logical structure, levels representing the depth of the chapter or list, and costs. In this embodiment, for the lines processed in the text format analyzing section 306, levels, attributes, and costs are not written to the hard disk 404 but are stored in main memory for fast processing. However, if data on the level, attribute, and cost cannot be stored in main memory all at one time since many lines are processed at a time, this data may be stored on the hard disk.

A keyword is described using a regular expression, and allows the description of a character string pattern rather than a specific character string. This is to show that character strings of the same pattern have the same attribute (in one document) (for instance, if "1.1" represents a header, "1.2," "5.1" and the like also represent headers).

The attributes include:

header, the first line of a paragraph, the last line of a paragraph, the first line of a list item, the continuation line of a list item, an ordinary line (a line which is not a header, or the first or the last of a paragraph, or part of a list), etc.

Described in the dictionary are regular expressions (representing patterns) and combination of available attribute labels, levels and costs for them, as shown below, for instance.

| | | |
|---|---|---|
| ^*Chapter[0–9]+ | (HEADER 1 CS3) | |
| ^*[0–9)+. [0–9]+ | (HEADER 2 CS3) | (OLIST 2 CS5) |
| ^. | (ULIST ? CS3) | |
| ^§ *[0–9]+ *[^0–9] | (HEADER 1 CS3) | |
| ^§ *[0–9]+ *. [0–9)+ *[^0–9] | (HEADER 2 CS3) | |
| ^* ( *[0–9]+ *) | (OLIST 1 CS3) | |
| ^* ( *[0–9]+. [–9]+ *) | (OLIST 2 CS3) | |
| ^*[0–9]+ *) | (OLIST 1 CS3) | |
| ^*[0–9]+. [^0–9] | (HEADER 1 CS3) | (OLIST 1 CS5) |
| ^*[0–9]+. [0–9]+. [0–9]+. ? + | (HEADER 3 CS3) | (OLIST 3 CS5) |
| ^*[0–9]+–[0–9]+ +[^–] | (HEADER 2 CS5) | (OLIST 2 CS3) |
| ^*[0–9]+–[0–9]+–[0–9]+ +[^–] | (HEADER 3 CS5) | (OLIST 3 CS3) |
| ^*[A–z]+. *[^A–z] | (HEADER 1 CS7) | (OLIST 1 CS3) |
| ^* ( *[A–z] *) | (OLIST 1 CS3) | |
| ^*[A–z] *) | (OLIST 1 CS3) | |
| ^* ( *[ア–ン] *) | (OLIST 1 CS3) | |
| ^*[ア–ン] *) | (OLIST 1 CS3) | |
| ^*. | (ULIST ? CS3) | |
| ^*. | (ULIST ? CS3) | |
| ^*_ | (ULIST ? CS3) | |

EXAMPLE 1

Dictionary Entries

These indicate that, if there is a character string that matches the regular expression of interest in a line, that line has any of the sets (of attribute level cost) (called labels) listed on the right side.

In the regular expression in example 1,

^: head of the line,

*: repetition more than 0 times of the preceding character,

[–]: a character whose character code lies between the characters specified on both sides of—(including both characters), and +: repetition more than one time of the preceding character.

Accordingly, for instance,

^ *Chapter[0–9]

indicates that there are 0 or more blanks after the beginning of the line, followed by the characters "Chapter" and one or more characters whose character code lies between 0 and 9 (including 0 and 9), namely numerals.

In the set (attribute level cost) of example 1, for instance, the following attributes are shown:

HEADER: header

OLIST: the first line of an ordered list item

ULIST: the first line of an unordered list item

Further, although not shown in example 1, there are other attributes, such as those that follow:

LCONT: continuation line of a list item

PBEGIN: the first line of a paragraph

PEND: the last line of a paragraph

ORDINARY: ordinary line (not a header, nor the first or last of a paragraph, nor part of a list)

Level is a numeral which shows the depth of the paragraph and chapter for HEADER, and the depth of the list for others. Sometimes, depth may be undefined (it can not be determined from the character string and it is determined from the context in a later stage), and, in this case, the level of the dictionary entry is set to "?".

Cost is represented by a character string beginning with CS, and the numeral following CS is the value of the cost.

Particularly regarding ^ *[0–9]+. [0–9]* (HEADER 2 CS3) (OLIST 2 CS5), it should be noted that two labels, "HEADER 2 CS3" and "(OLIST 2 CS5)", are assigned there. If the assignment of more than one labels is allowed, ambiguity occurs in the logical structure interpretation, but the present invention is characterized by positively taking advantage of such ambiguity to rank and display more than one possible candidates of the logical structure of a document in descending order. In this case, the assigned cost gives an index which numerically represents the plausibility of the logical structure obtained through analysis. That is, the greater the assigned cost is, the lower the validity or plausibility is. Thus, if the two labels of "(HEADER 2 CS3)" and "(OLIST 2 CS5)" are assigned, it means that the system determines that the validity of being a header is greater than the validity of being the first line of a list item. In addition, the value of a cost is determined statistically or manually by examining a number of sample sentences beforehand.

The first line in example 1 means that the line beginning with a character string such as "Chapter 1" or "Chapter 12" is a header of level 1 and the cost for that is 3. Further, the second line means that the line is a header of two levels or the beginning of a list item (ordered) if there is "1.2" or "3.3," and the cost for them is 3 and 5. Similarly, from the description in the third line, • is the first candidate of list items (unordered), and the level is indefinite, in other words, it can occur in any level with a cost of 3.

A dictionary retrieval program 412 reads a dictionary file 416 into main memory and converts it to a finite-state automaton, and thereafter, by matching the character string in the four elements (line) of the line data 414 from the beginning on a character-by-character basis, it retrieves the regular expression in the character string. (This retrieval method is a standard one for the matching of a regular expression and character string.)

If the character string contains a substring corresponding to the regular expression, the label corresponding to the regular expression (the label written to the right of the regular expression in the dictionary) is assigned to that line.

At this stage, more than one labels can be attached to one line. Which of the labels is valid may depend on other characteristics of the line, for instance, Indentation (e.g.: the first line of a paragraph is indented, etc.), font size (e.g.: the header is printed in large characters, etc.) or the like, or some combination of them, or may depend on the combination with the characteristics of the preceding and next lines. These are solved in the later stages of graph creation and analysis. In addition, the elements which are undefined at the stage of consulting the dictionary, such as the level of an unordered list, are also determined later on.

For instance, the following sentence is considered:

Table 1

| Character string | Left end | Line length | Font | |
|---|---|---|---|---|
| Chapter 1 Document Image Analysis | 0 | 36 | 2 | (1) |
| Information extracted in the document image analysis ... | 2 | 60 | 1 | (2) |
| 1.1 Text | 4 | 9 | 1 | (3) |
| Character code only | 10 | 19 | 1 | (4) |
| 1.2 Layout information | 4 | 23 | 1 | (5) |
| Extracted from printed image | 10 | 28 | 1 | (6) |
| 1.2 and 1.3 are different | 10 | 28 | 1 | (7) |
| 1.3 Logical structure | 4 | 22 | 1 | (8) |
| Conversion into tags of structure description ... | 10 | 56 | 1 | (9) |
| . GML | 12 | 4 | 0.8 | (10) |
| . Latex | 12 | 7 | 0.7 | (11) |
| is processed. | 10 | 13 | 1 | (12) |
| Many systems were devised to extract this | 4 | 55 | 1 | (13) |
| information, for instance, the following; | 4 | 28 | 1 | (14) |
| Defaultindent = 4 | | | | |
| Defaultlength = 60 | | | | |
| Defaultsize = 1 | | | | |

EXAMPLE 2

Example of Text

In the above example,

Defaultindent represents the default left end,

Defaultlength represents the default line length (right end minus left end), and Defaultsize represents the default font size.

Based on with the dictionary in example 1, the following possibility exists:

TABLE 2

| (1) | : | (HEADER 1 CS3) |
| (3),(5),(7),(8) | : | (HEADER 2 CS3) or (OLIST 2 CS5) |
| (10),(11) | : | (ULIST ? CS3) |

However, on the one hand, (3), (5) and (8) are logically presumed to be the beginning of a list item in view of the fact that:

the indent is larger than the text, and a pattern of the same type which has a continuous number appears at a relatively near position (*).

On the other hand, (7) happened to be of the same type as (3), (5) and (8), but it should be part of a list item beginning from (5), or the continuation of a list. The reason for this is that the indent of (7) is not aligned with the preceding (3) and (5) regardless of being of the same type as they are, and thus it is not likely to be the beginning of a list item of the same level. A list may be nested but, in that case, the number should start from one. Even if it is assumed to be the header of level 2, it is not logical that the number does not start from one. Accordingly, it is inappropriate that this line is determined to be the starting line of a list item or a header.

Further, since (10) and (11) are items in a list item starting from (8), its level should be 2. In addition, (4), (6), (9), and (12) are continuation lines of a list, but discrimination between these and ordinary lines cannot be determined only from the lines themselves. In addition, (12) is at the same level as (9) in the above figure, if the indent is as shown in:

TABLE 3

| • LaTeX | (11') |
| is processed. | (12') | it should be determined that (12') is at the same level as (11'), and for

TABLE 4

| • LaTex | (11") |
| (macro of TeX) | (12") |

The indent is the same as (11) and (12), but it should be determined from the content that (12") is at the same level as (11").

Such determinations cannot be made if various characteristics of the lines appearing before and after the line of interest such as an attribute, length, indent, and whether or not it is a block boundary are not considered. It is difficult to determine uniquely from any single characteristic, and no determination may be performed without sophisticated processing related to the content of the document, as in (11") and (12"). In addition, various styles of printed documents exist and, if it is desired to deal with a wide range of documents, one-to-one correspondence cannot be provided between characteristics and attributes. Further, determination based on a ambiguous determination criterion such as shown by (*) above may be needed.

As described above, to determine the plausibility of each candidate of attributes, the relationships between the attributes of the preceding and next lines must be considered. In addition, the validity is not definitely determined but has ambiguity.

To order the possible interpretations according to their plausibility, a document is represented in the graph creating section by a directed graph whose nodes are the respective ones of attributes of each line and whose links are the adjacency of lines. The respective paths reaching from the starting point to the ending point of the graph are the respective possibilities of the logical structures of a document.

In FIG. 4, a graph creating section 308 is a processing module for creating an analysis graph 424 and consists of a grammar file 420 stored on the hard disk 404 and a grammar interpreter 418 resident processes in main memory which interpretes the grammar stored in file 420 and the graph 424.

The input to the graph creating section 308 is a set of <line, attribute label>. Here, line is a line in line data 414, and attribute label is the one determined in the format analyzing section 306 from a keyword in the line. When a line does not contain any of the regular expressions given in the dictionary, a label of (ORDINARY ? CS3) is assigned.

The graph 424 is a directed graph in which a cost is added to each node and link and it is stored on the hard disk 404 in a predetermined data structure. For the link, a cost is attached determined by the relationship between the characteristics of the line of interest and the preceding and next lines thereof. The cost attached to the node is provided by the characteristics of the line of interest and the connection relationship thereof. (For instance, if a Header label is attached, the cost (CS3) described in the dictionary is used if no other condition is specifically given but, if the right margin is smaller than a predetermined value, the possibility of being text becomes high and thus the cost is increased.) In addition, any label which cannot exist logically at the point of the interlabel connection relationship is excluded at this stage. Further, as in (7), described above, considering the possibility of a line (ordinary) which by chance has the pattern to become a keyword, also for a line labeled in the dictionary, a node labeled an ordinary line is added if it satisfies a predetermined condition.

The connection condition as described above or the cost adjustment for the connection is described in the file 420 on the hard disk 404, using a type 3 grammar as shown in example 3, below.

EXAMPLE 3

[Numeric expression 1]

```
HEADER:  START
         PEND
         {
             if(fontsize > Defaultsize) Cost-;
             if(indent > Defaultindent) Cost+;
             if(rightmargin<Threshold) Cost+;
             ADD(HEADER,Level,N,Cost,2);
             if(period) ADD(ORDINARY,?,3,2);
         }
OLIST:   ORDINARY
         PBEGIN
         {
             if(fontsize > Defaultsize) Cost+;
             if(indent > Defaultindent) Cost-;
             ADD(OLIST,Level,cost,2);
             ADD(ORDINARY,?,6,2)
         }
OLIST:   OLIST
         ULIST
         LCONT
         {
             if(fontsize > Defaultsize) Cost+;
             if(indent > Defaultindent) Cost-;
             ADD(OLIST,Level,Cost,2);
             ADD(ORDINARY,?,6,3)
             ADD(CONT,?,6,2);
         }
ULIST:   ORDINARY
         PBEGIN
         LCONT
         {
             if(fontsize > Defaultsize) Cost+;
             if(indent > Defaultindent) Cost-;
             ADD(ULIST,Level,Cost,2);
         }
ORDINARY: PEND
          HEADER
         {
             if(font>Defaultsize & indent<Defaultindent)
             ADD(HEADER,?,5,2);
             else if(indent>Defaultindent) ADD(PBEGIN,?,3,2);
             else ADD(PBEGIN,?,5,2);
         }
ORDINARY: PBEGIN
          ORDINARY
         {
             ADD(ORDINARY,?,3,3);
             if(period)
                 if(length<Defaultlength)ADD(PEND,?,2, 2);
             else ADD(PEND, ?, 3, 2);
         }
ORDINARY: OLIST
          ULIST
          LCONT
         {
             ADD(ORDINARY,?,3,3);
             ADD(LCONT,?, 3,2);
         }
END:     PEND
         {
             ADD(END,?,0,0)
         }
```

In the above example 3, the expression

P:  Q1

-continued

[Numeric expression 1]

```
Q2
Q3
{
}
``` indicates that a node having an attribute P is connected to a node having attributes of Q1, Q2, or Q3 and the operation in { } is performed.

Cost represents the cost described in the dictionary,

Level represents a level described in the dictionary, and

Threshold represents a constant representing a threshold value.

In example 3, the statement Cost+ or Cost- indicates that the value of Cost is incremented or decremented by a predetermined unit. As the predetermined unit, 2 is set in this example, but 1 or another value may be selected as needed.

ADD(class,level,node__cost,link__cost) indicates that a node having an attribute level of class and a cost of node cost is connected, and this cost is assigned to a link of link__cost. Thus, the resultant graph has costs for both node and link. There should be one or more ADD sentences in { } of the rule.

The first rule of example 3 above indicates that the HEADER line can appear next to the last line of a paragraph (that is, a link can be spanned from a node having the last attribute of the paragraph to a node having the HEADER attribute), and, in this step, if that line is printed with a font larger than the default size, the cost is decreased (it is determined that the possibility of being a HEADER is high), and, if that line is indented or its right margin is smaller than a fixed value, the cost is increased, and, if there is a period at the end of the line, it has the attribute of an ordinary line and a node of an indefinite level and cost 3 is also added.

The second rule indicates that the OLIST line can appear next to an ordinary line or the first line of a paragraph, and, in this step, unlike for the HEADER line, the cost is increased for a large font and decreased for indent, and a node of an ordinary line of cost 6 is always added.

The third rule indicates that, if the OLIST line appears next to the first line of a list (both ordered and unordered) or the continuation line of a list, the node next to the continuation line of the list is also added in addition to the above possibility, assuming that it is the continuation line of the list.

In the fourth rule, the ULIST line can appear next to an ordinary line, the first line of a paragraph, the first line of a list, or the continuation line of a list, and, in this step, the cost is increased for a large font and decreased for indent, and unlike for the OLIST line, it is assumed that there is no possibility of being an ordinary line.

The fifth to seventh rules indicate how to deal with ordinary lines. The fifth rule indicates that, if an ordinary line appears next to the last line of a paragraph or a header, this line is recognized to be a header and the attribute is changed to HEADER if the indent is smaller than the default one (is to the left) and the font is large; otherwise it is recognized to be the beginning of a paragraph and the attribute is changed to PBEGIN.

In the sixth rule, if an ordinary line exists in a paragraph and there is a period at the end of the line, it is deemed to definitely be the end of the paragraph, if it is short, and the node of PEND is added with a cost smaller than ORDINARY; if it is not short, it is considered that it may or may not be end of the paragraph, and the node of PEND is added with the same cost as the node of ORDINARY. Further, the seventh rule indicates that, if an ordinary line appears within a list, it is considered that it may be the continuation line of the list.

The grammar interpreter section 418 applies a grammar 420 to the input. Then, with reference to the flowcharts in FIGS. 5 to 8, the process in the grammar interpreter section 418 is described.

Figure 5:
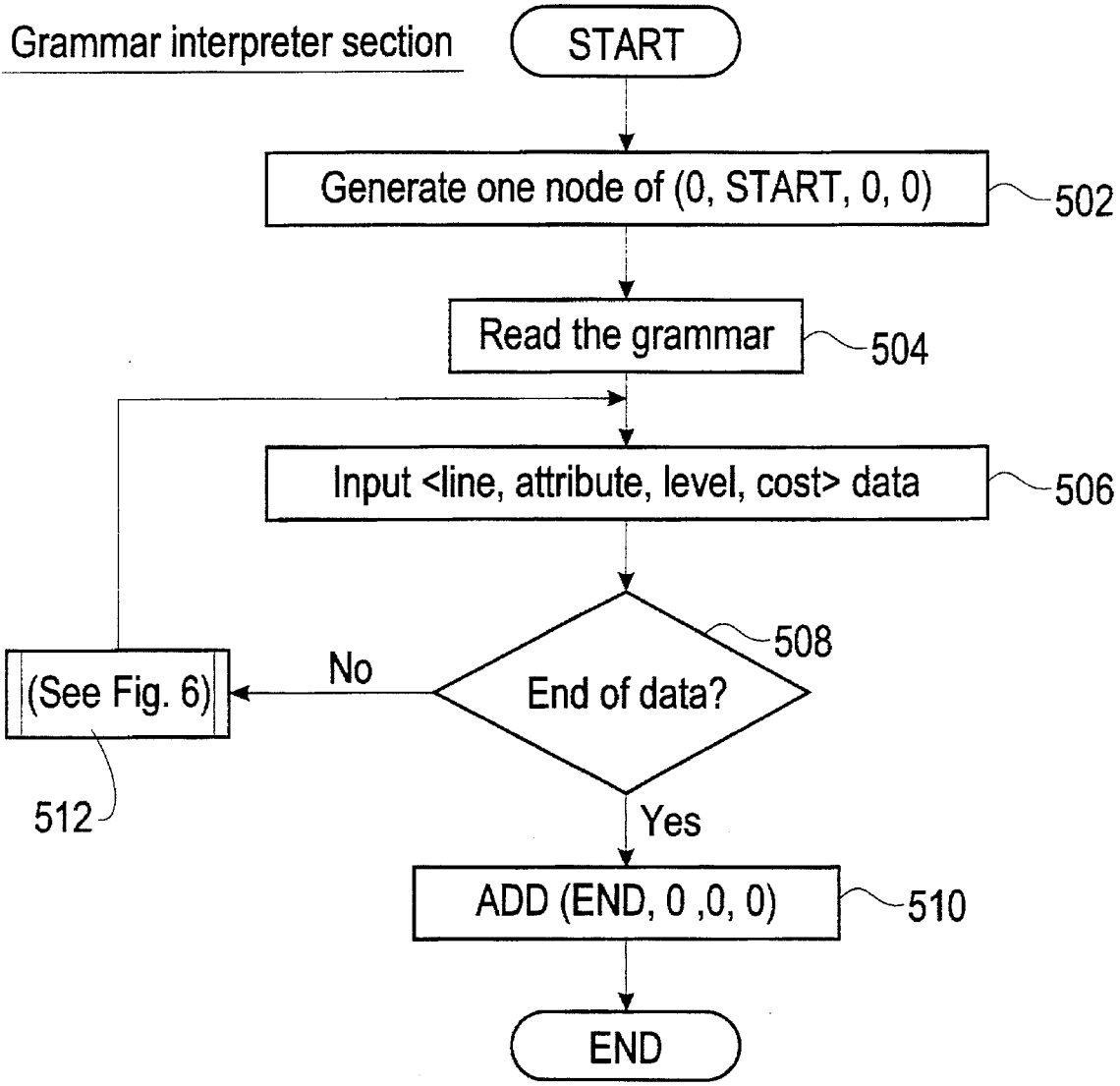
FIG. 5 is a flowchart showing the process in the grammar interpreter section in the analysis graph creating section.

FIG. 5 shows the general flow of the process in the grammar interpreter section 418. First, in step 502, (φ, START, 0, 0), which becomes the root node of a graph, is generated.

In step 504, the content of the grammar file 420 is read from the hard disk 404.

In step 506, data containing <line, attribute, level, cost>, which corresponds to the first line of a text, is read in main memory. What is indicated as a line includes values such as character string ($T_n$), indent ($I_n$), line length ($L_n$), and font size ($F_n$) shows in FIG. 4 as line data 414, and these are used in step 512. In step 506, the data related to all of the <attributes, levels, costs> of this line are read. "All" is mentioned here because, in accordance with the present invention, a plurality of <attributes, levels, costs> can be given to one line.

Then, in step 508, it is determined whether the end of data, or the data corresponding to the last line, has already been read. If so, in step 510, a node becoming the end of the graph is connected by ADD(END, 0, 0, 0), completing the process.

Figure 6:
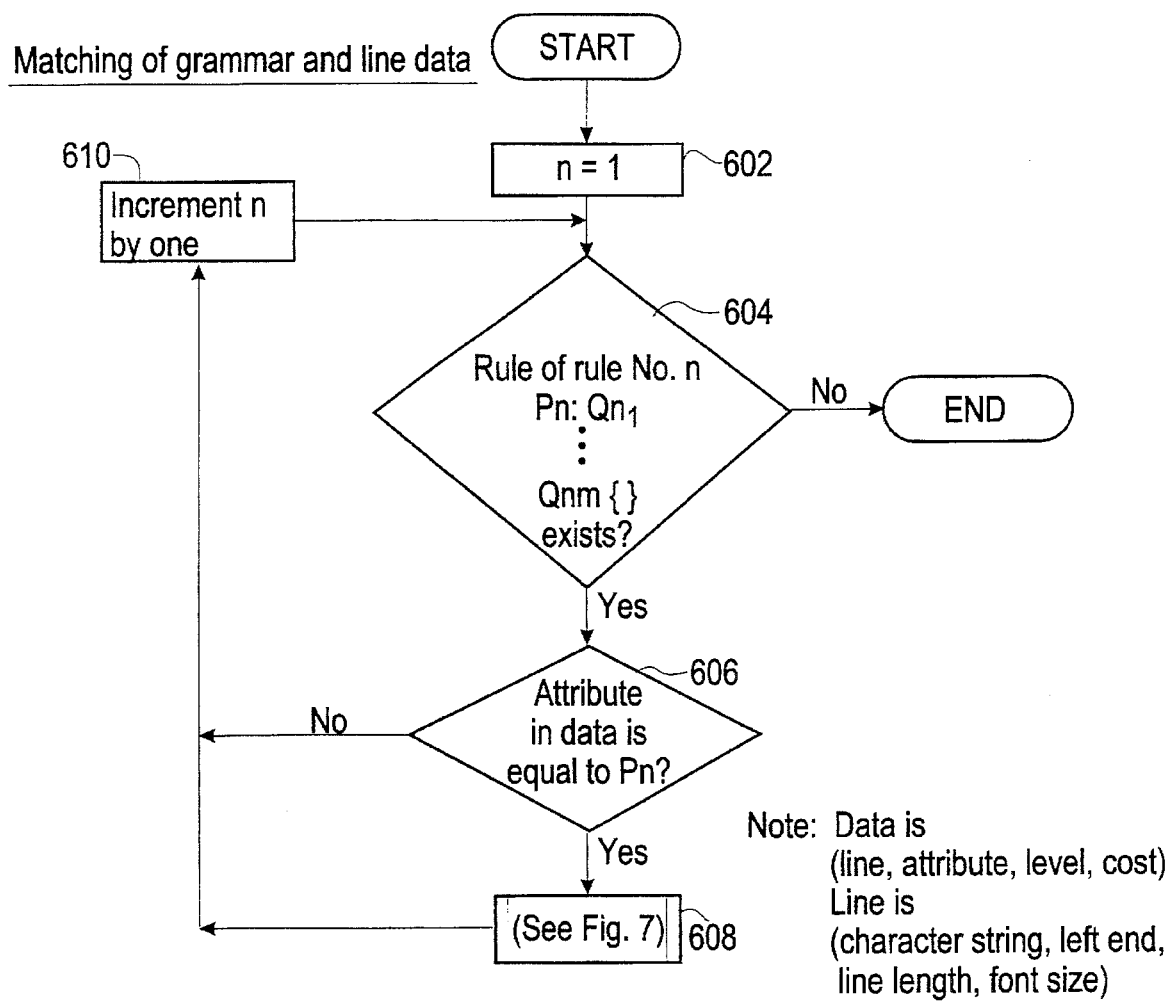
FIG. 6 is a flowchart showing the process for matching the grammar and line data in the analysis graph creating section.

If, in step 508, it is determined to not be the end of data, the flow in step 512 proceeds to the "grammar and line data matching" process described in detail in FIG. 6 and, after completion of the process, the flow returns to step 506 where data containing <line, attribute, level, cost> corresponding to the next line of the text is read.

Then, referring to FIG. 6, the process referred to as step 512 in FIG. 5 is described. In FIG. 6, 1 is stored in an integer variable n in step 602.

In step 604, it is determined whether the n-th rule exists. If it does not exist, it means that a determination has been made as to the applicability of all of the rules, for instance, shown in example 3 above, the process of FIG. 6 is completed.

If the n-th rule exists, the flow proceeds to step 606 where it is determined whether the attribute (or attributes) of the current line is equal to the n-th rule $P_n$.

Figure 7:
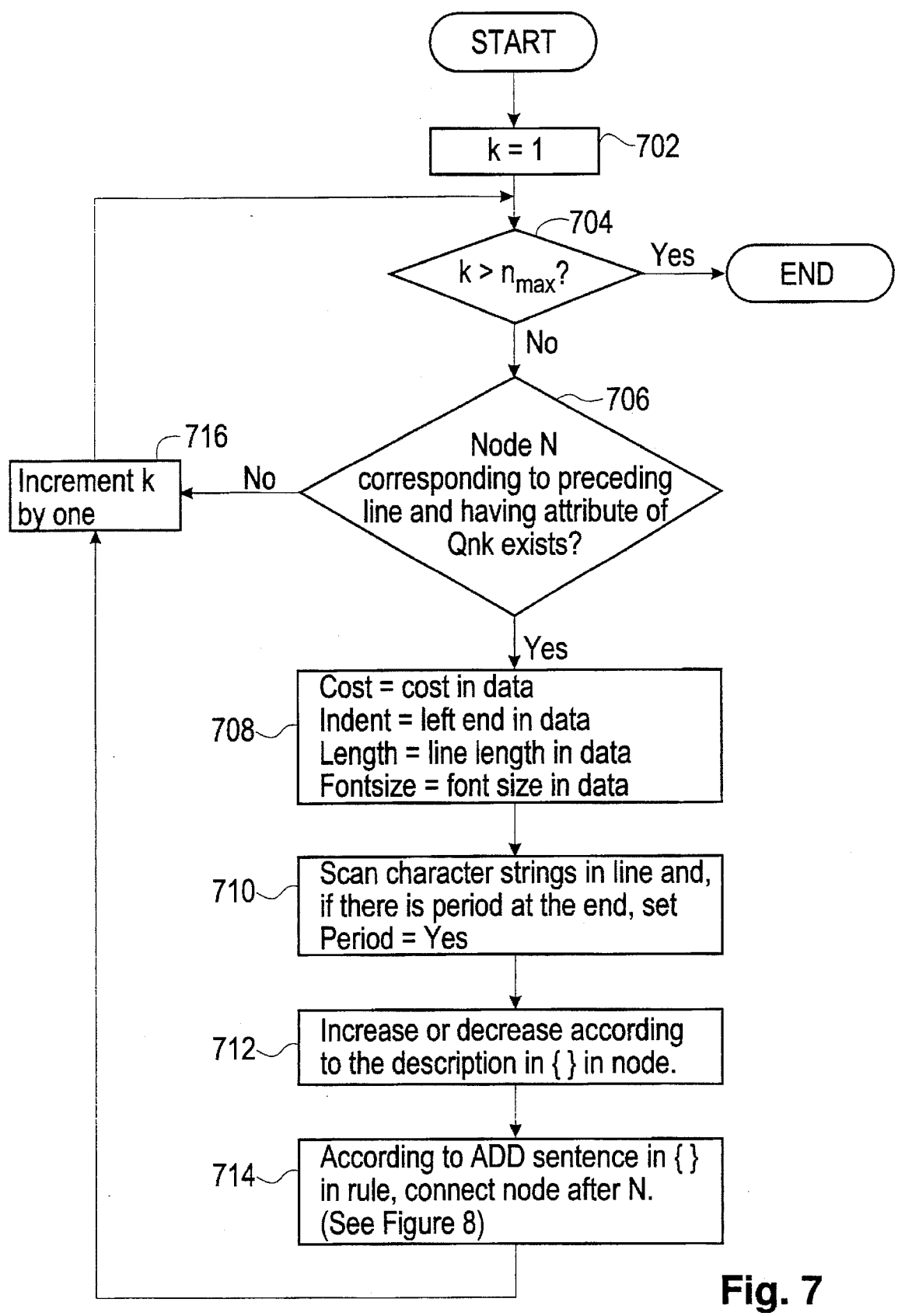
FIG. 7 is a flowchart showing the process for applying the rule to nodes in the analysis graph creating section.

If it is determined that the attribute (or attributes) of the preceding line is equal to the n-th rule $P_n$, the flow proceeds to step 608 detailed in FIG. 7 and then to step 610. Otherwise, since the n-th rule cannot apply, the flow immediately goes to step 610.

In step 610, n is incremented by one, whereby in step 604, the determination is made for the rule next to the rule determined in the previous cycle.

Now, referring to FIG. 7, a description is made of the process referred to as step 608 in FIG. 6. In FIG. 7, 1 is stored in an integer variable k in step 702.

In step 704, it is determined whether $k>n_{max}$, where $n_{max}$ is the number of Qs of the n-th rule to which attention is currently paid. For instance, in a rule such as:

| [Numeric expression 2] |
| --- |
| ORDINARY:   OLIST<br>                ULIST<br>                LCONT<br>{ |

| -continued |
| --- |
| [Numeric expression 2] |
|     ADD(ORDINARY,?,3,3);<br>    ADD(LCONT,?, 3,2);<br>} |

$n_{max}=3$. $k>n_{max}$ means that all of the Qs of this rule have been examined, and thus the process of FIG. 7 is completed.

If $k>n_{max}$ does not hold, the flow goes to step 706, where it is determined for the preceding line whether a node N whose attribute is $Q_{nk}$ exists. $Q_{nk}$ means the k-th Q of the n-th rule.

If such a node N is found, the flow proceeds to step 708 where the cost for the attribute (limited to one in step 606 in FIG. 6 though it may be plural) of the current line is stored in a variable called cost, the indent value of the current line is stored in a variable called indent, the line length of the current line is stored in a variable called length, and the font size of the current line is stored in a variable called fontsize. Although there are other variables such as rightmargin, they are omitted for the convenience of the description. These variable values, as seen from the rule.

| [Numeric expression 3] |
| --- |
| OLIST:    ORDINARY<br>    PBEGIN<br>    {<br>        if(fontsize > Defaultsize) cost+;<br>        if(indent > Defaultindent) Cost−;<br>        ADD(OLIST,Level,Cost,2);<br>        ADD(ORDINARY,?,6,2);<br>    } | are used to increase or decrease the cost in { } of the rule.

In step 710, the character string of the current line is scanned and, if it is determined that there is a period at the end of it, the logical variable called period is changed to yes (in C language, an integer 1 is substituted because it has originally no logical variable). The variable called period is used in the rule as follows, for instance:

| [Numeric expression 4] |
| --- |
| ORDINARY:   PBEGIN<br>                 ORDINARY<br>{<br>    ADD(ORDINARY,?,3,3);<br>    if(period)<br>        if(length<Defaultlength)ADD(PEND,?, 2, 2);<br>    else ADD(PEND, ?, 3, 2);<br>} |

In step 712, the cost of the node N is increased or decreased according to the description in { } in the rule.

In step 714, a new node is generated in accordance with the ADD sentence in { } in the rule and connected after the node N. The process in step 714 is described in more detail with reference to FIG. 8. After step 714, k is incremented by one in step 716 and the process returns to step 704.

Figure 8:
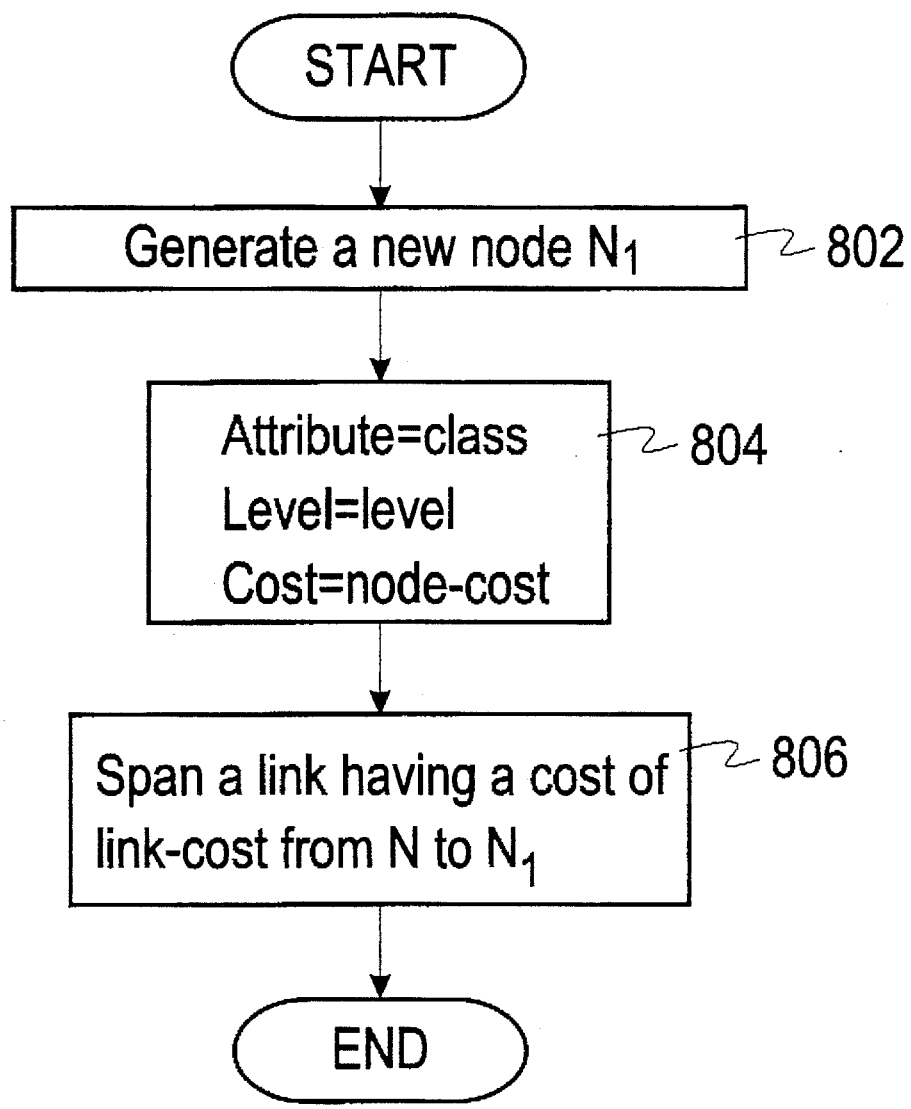
FIG. 8 is a flowchart showing the node creation process by an ADD function in the analysis graph creating section.

Then, referring to FIG. 8, the process shown as step 714 in FIG. 7 is described in more detail. This process shows the process of ADD(class, level, node__cost, link__cost) which is used in the above described rule.

In step 802 of FIG. 8, a new node $N_1$ is generated. If implemented in C language, this is performed by allocation of the region for the size of the structure of one node from main memory.

In step 804, class is substituted for the attribute of the newly generated node $N_1$, level is substituted for the level and node cost is substituted for the cost.

In step 806, a link is formed from the node N determined by the attribute determination in step 706 in FIG. 7 to the just generated node $N_1$, and the cost of a link_cost value is assigned to the link.

In addition, the above described values of class, level, node_cost, and link_cost are provided as the argument for the ADD function of the rule which is currently applied. It is to be noted that, as shown in example 3 described above, each of a plurality of rules always has at least one ADD function, and, thus, at least one new node is generated, whichever rule is applied.

Figure 9:
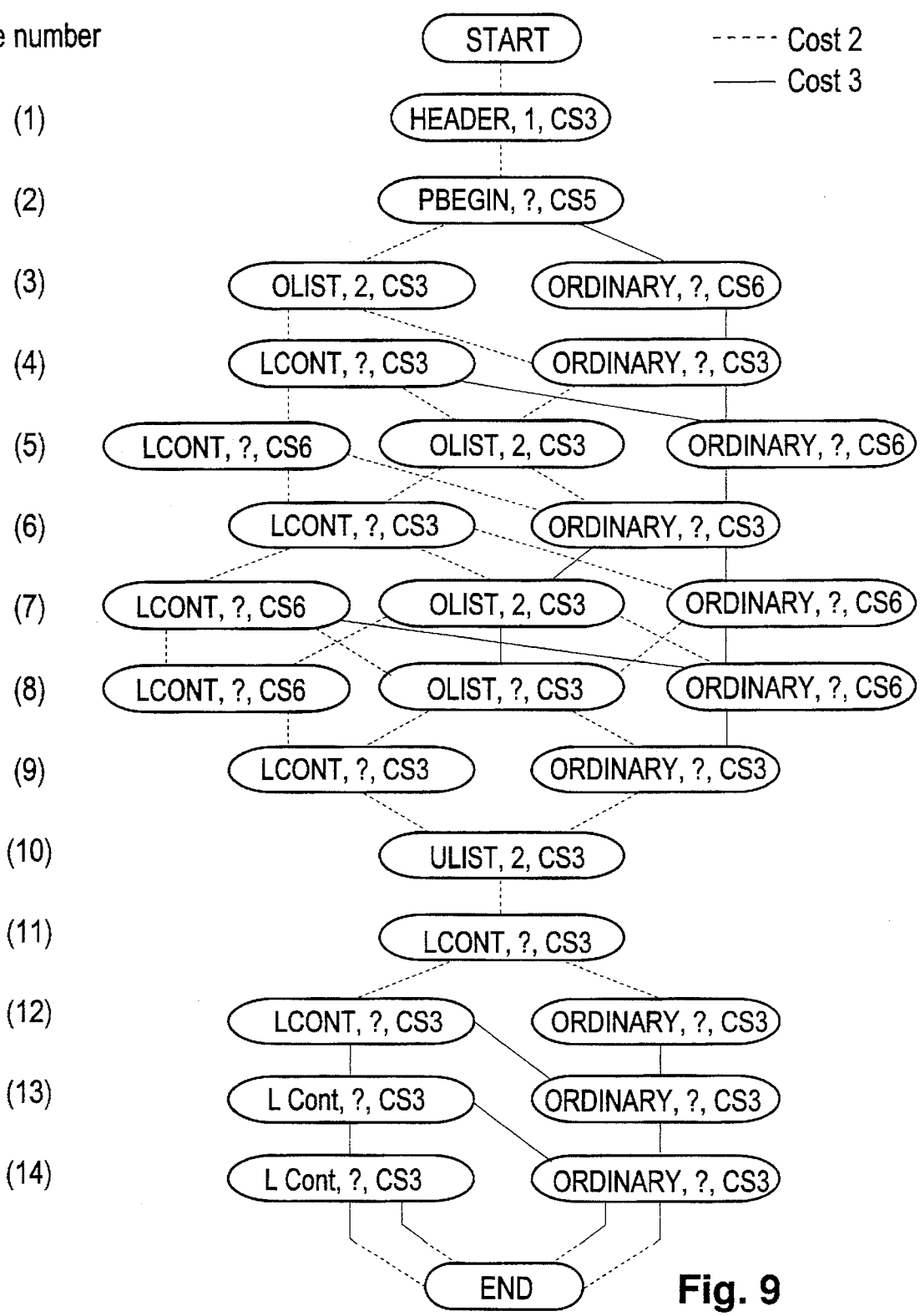
FIG. 9 is a diagram showing an example of the graph with costs generated by the process of the present invention.

After such a process is carried out by the graph creating section 308, graph structure data as shown by reference number 414 in FIG. 4 is created, and, in this embodiment, it is temporarily stored on the hard disk 404 as shown in FIG. 4, though it may be only stored in main memory. To show a more specific example, a graph such as that in FIG. 9 is created from the above sample sentence. The possibility of (3), (5), (7), (8) being a header is excluded at this stage (because HEADER never follows PGEGIN in the above grammar). In addition, to which list item the continuation line of list is directed is indefinite at this stage, and this is solved in the next graph search stage.

The present invention considers that the graph 424 represents candidates for logical structure interpretation. That is, each of the respective paths from the start to the end represents one logical structure interpretation. In this case, since the cost is independently assigned to each node and link by the processes described in FIGS. 5 to 8, the most appropriate logical structure interpretation can be obtained if a search is made for the path having the smallest cost among the respective paths. However, in the graph 424, creation and cost assignment are performed only by the connection relationships before and after the particular node corresponding to the current line. For instance, assuming that the current line is a header (the beginning of a list item), the connection relationship with the preceding header (the beginning of a list item) is not considered.

For instance, line (3) of example 3 was assigned the attribute label corresponding to the beginning of a list item of level 2 in the previous stages (text format analyzing section and graph creation section). However, since there has been no list item in the same paragraph until that time, the level should be 1.

In addition, line (5) is labeled OLIST, ORDINARY, and LCONT because of its format and grammar. However, from comparison with the beginning ((3)) of the preceding list item, the labels LCONT (this means that (5) is part of the list item beginning with (3)) and ORDINARY (this means that (5) is another line, that is, the list beginning with (3) ends only in (3), (4) and the next list item belongs to another list) can be excluded. (This is also applied to (8).)

Further, since (7) has an indent which is to the right of (3) and (5), the possibility of being the beginning of a list item of the same level is low, and the possibility of being ORDINARY or LCONT is high. (The possibility of the list being nested and (7) being a header of level 2 is low because the number does not start with 1.) From indent, it is appropriate that it is determined to be the continuation line of a list item starting from (5).

Furthermore, in the graph 424, the level of the continuation line of a list is undefined, and it is determined from comparison with the start line of the preceding list item for indent. Example 4 is shown as heuristics for performing these cost adjustments. A cost adjustment is carried out for the cost for a link. The reason for this is that, if there are different paths even for the same node (this means that the preceding and subsequent lines are different), there may be a case in which the cost should be made different.

For this, in the analysis graph search section 310 (FIG. 4), the attribute value associated with each label (in this example, level) is held at a node and propagated to the subsequent nodes in the search stage to perform a pruning or reevaluation of the cost. By this, the description of the logical structure of a document is not limited to the range of the regular grammar, but can be equivalent to context-free grammar or higher descriptive power.

The input to the graph search section 310 is the data of the file 424 of a graph stored on the hard disk 404 and expressed by a predetermined data structure, and the output thereof is a prioritized graph 426. That is, on the prioritized graph 426, data representing a path starting from the start and reaching the end is ordered and expressed in an ascending order of the sum of the costs associated with the nodes land links on the path. Each path data contained in such a prioritized graph 426 can easily be converted to a document with tags such as BookMaster or Tex by inputting it to an appropriate text processing program.

The search in the graph search section 310 is performed not only for the optimum one but also for all of those whose cost difference between the optimum path is within a predetermined value or those within the N-th order (N is a predetermined integer larger than 1). This allows one or more interpretations to be temporarily output for the part for which ambiguity still remains. As one way which enables such search, for instance, there is an approach which Itoh and Maruyama use in morphological analysis and the post-processing of OCR (Itoh, Maruyama: Error detection and automatic correction of OCR-input Japanese sentences, Proc. of Information Processing Society, Vol. 33, No. 5, pp. 664–670, 1992). Also, a similar description is found in the Patent Application LaidOpen No. 5-46590 official gazette. These are characterized by combination of the graph search method of Dijkstra and beam search.

As a result of the above described analysis graph creation and path search, document logical structures can be obtained in the descending order of their plausibility.

Figure 10:
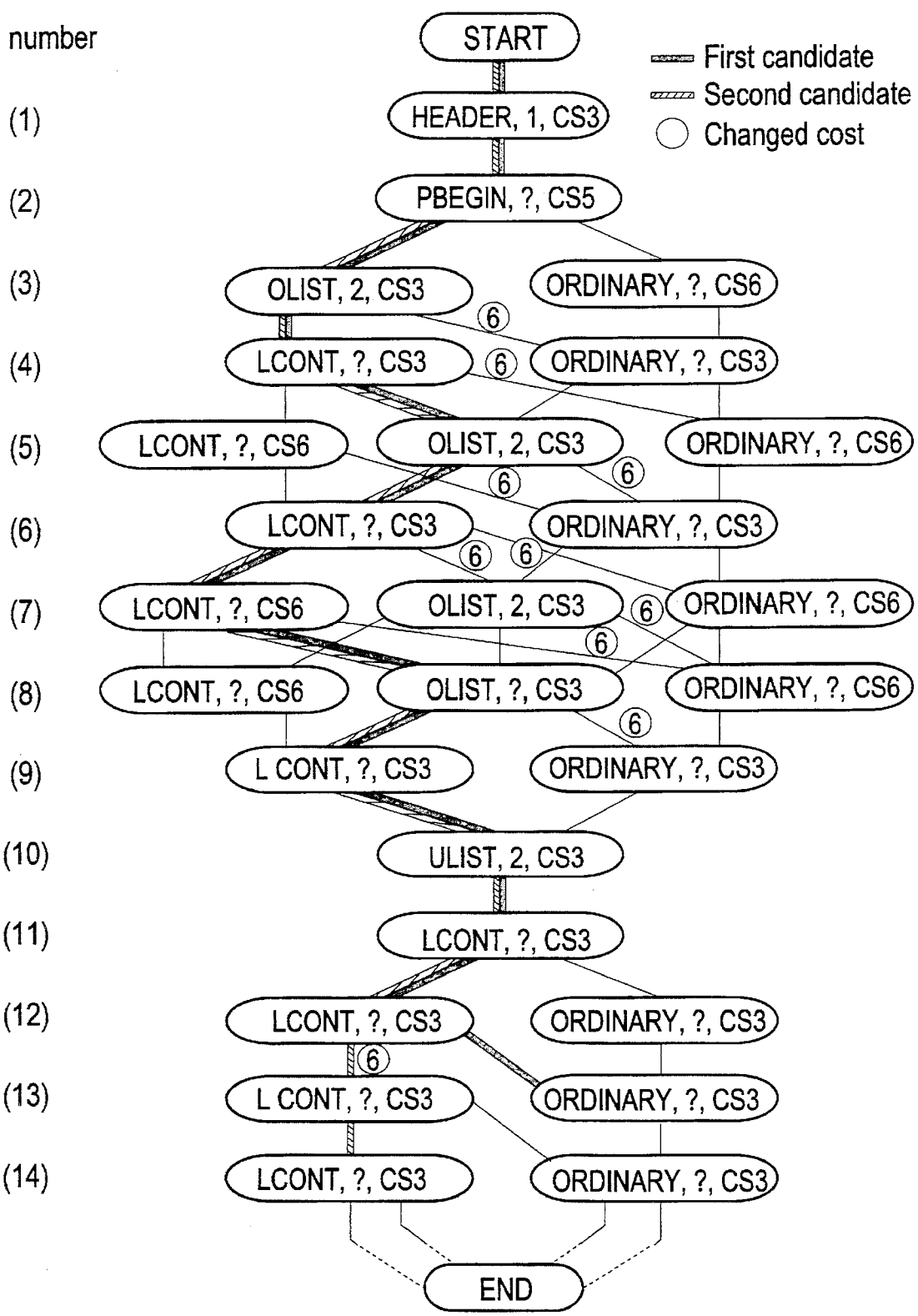
FIG. 10 is a diagram showing the first and second candidates for paths in an ascending order of costs after the application of heuristics in the graph in FIG. 9.

The prioritized graph created from the graph of FIG. 9 is shown in FIG. 10. This shows that by applying heuristics existing within the graph search section 310 and as shown in the example 4 below, the cost assigned to the links is modified, and the modified costs are calculated for each path of the graph and exhibited from lower ones to the second candidate.

EXAMPLE 4

Heuristics for Cost Modification

For a node having the attribute level of HEADER on the particular path,
if there is no HEADER of the same format before it, the cost is increased if the number is not 1. The level is set to 1 regardless of the level written in the dictionary.

If its format (written in the dictionary) and level are the same as the preceding HEADER and the number (such as "1" of Chapter 1) continues, the level is made equal to the preceding level. In this case, the cost is not modified. If the level is the same and the number does not continue, it is made equal to the preceding level, but the cost is increased.

If the level written in the dictionary is higher than the preceding HEADER, the cost is increased if the number is not 1.

If the level is lower than the preceding HEADER, the path is in traced reverse to search for a HEADER node of the same format and same level. If there is no such node, the cost is increased. If there is, whether the number continues is checked and, if not, the cost is increased.

For a node having an attribute label of OLIST on the particular path,

> if the same paragraph does not contain OLIST AND ULIST before the particular node, the cost is increased if the number is not 1. The level is set to 1 regardless of the level written in the dictionary.

If the format (written in the dictionary) and level are the same as the preceding OLIST and the number continues, the level is set to the same as the preceding level. In this case, if the indent is the same as the preceding OLIST, the cost is not changed. If the level is the same and the number continues or the indent is not in harmony, then the level is set to the same as the preceding level, but the cost is increased.

If the level written in the dictionary is higher than the preceding OLIST, the cost is increased if the number is not 1. Further, at this point, if the indent is more to the left than the preceding OLIST, the cost is increased.

If the level is lower than the preceding OLIST, the path is reversely traced to search a OLIST node of the same level. If there is no such node, the cost is increased. If there is, whether the number continues is examined and, if not, the cost is increased. Further, at this point, if the indent is not the same as OLIST of the same level, the cost is increased.

If the same paragraph contains no OLIST of the same format before the particular node, but there is a different OLIST or ULIST, > if the indent is more to the right than the preceding OLIST or ULIST, the level is assumed to be deeper and set to the level of the preceding OLIST or ULIST plus one. At this point, if the number is not 1, the cost is increased.
>
> If the indent is more to the right than the preceding OLIST or ULIST, the path is traced in reverse to search for a OLIST node of the same level. If there is no such node, the cost is increased. If there is, whether the number continues is checked and, if not, the cost is increased. Further, at this point, if the indent is not the same as the found OLIST of the same level, the cost is increased.

For a node having an attribute label of ULIST on the particular path,

> If the same paragraph contains no ULIST or OLIST before the particular node, the level is set to 1.
>
> If there is only OLIST, the level is set to the level of the preceding OLIST plus one. At this point, if the indent is more to the left than that OLIST, the cost is increased.
>
> If there is ULIST and the format is the same as that, the level is made to equal to the preceding level.
>
> If the format is different from the preceding ULIST, the path is traced in reverse to search for a ULIST node of the same format.
>
> If there is no such node, the cost is increased if the indent is more to the left than the preceding ULIST. The level is set to the level of the preceding ULIST or OLIST plus one.
>
> If there is such a node, the cost is increased if the indent is not the same as the found ULIST of the same format.

For a node having an attribute of ORDINARY on the particular path, if the preceding node is OLIST, ULIST, or LCONT, the cost is increased if the indent is more to the right than or the same as that line.

For a node having an attribute label of LCONT on the particular path,

> if the attribute of the preceding node is LCONT and the indent is the same, the level is made equal to that node.
>
> Otherwise, the path is traced in reverse to search for a OLIST or ULIST node of the same paragraph. The level is made to equal to OLIST or ULIST nearest to the particular node the indent of which is the same as or more to the left than the particular node.
>
> If there is no such OLIST or ULIST (that is, the indent is more to the left than any OLIST or ULIST of the same paragraph), the cost is increased, with the level being set to 1.

In addition, in accordance with the heuristics of the above example 4, (12") is assumed to be the same level as (11").

Further, to tag the path obtained in FIG. 10 is easy, and, basically, tagging can be made only by the attribute and level of a node. For instance, if a node having the attribute of HEADER is encountered along a selected path, a tag corresponding to the header is attached to the beginning of the line associated with that node, which is output to the hard disk 404. Then, if a node having an attribute of OLIST is encountered, a tag indicating an ordered list is attached to it, and the line associated with the node is output. Then, if a node having the attribute of LCONT is encountered, a tag indicating continuation of an ordered list is attached to it, and the line associated with the node is output. Further, if a node having an attribute of ORDINARY is encountered, a tag indicating the end of an ordered list is output and a carriage return is performed, and then the line associated with the node is output. In addition, the level is required when a return is made from a line of the attribute of list to a line of the ordinary attribute and the like. For instance, a return may be made directly from a list of level 2 to a sentence of an ordinary line and, in this case, if level 2, it is needed to output two tags indicating the end of a list. In this way, when the final node is reached, tagging to all of the sentences is completed.

The present invention produces the following advantages:

1. Not only the logical structure of a document can be described by a grammar with attribute values, but also the characteristics such as whether an indent is large or small, and differences in front size, which are difficult to describe with the framework of the grammar, can be comprehensively reflected by increasing or decreasing the cost associated with the particular transition.

2. By interpretation of the logical structure by a graph search problem, and enabling the search up to N-th, more than one candidate can be output in the order of the plausibility of their interpretation.

3. To detect a portion including ambiguity is more easy, and thus it is also possible to warn the user.

Accordingly, the present invention satisfies the requirements (A) to (C) described in "Means for solving the problems," and has proved that it runs at a practically sufficient speed (in the order of 100 lines/s on a personal computer with a CPU of i486 (trademark of Intel) of 33 MHz). Examples of actual input and output are shown in FIGS. 11 and 12, respectively. However, to express a logical structure, tagging is performed using the system of IBM BookMaster (User's Guide for IBM BookMaster, N:SC34-5009, (1989)).

Further, an analysis of two chapters of manuals and ten articles shows that 86% of the tagging in the manuals was correct and 82% of the tagging was correct in the articles for the first candidate. If the second candidate is also allowed, the proportion of correct tags increases to 89%. This exhibits the advantage that a plurality of solutions can be presented.

I claim:

1. In a method for analyzing the logical structure of a document stored in readable form in a computer system in processing by said computer system, a method for analyzing the logical structure of a document comprising the steps of:

(a) reading said document into the memory region of said computer system on a line-by-line basis;

(b) determining an attribute of said line comprising a start of a list, a continuation of a list, and the attributes of an ordinary line which is read into said memory region in accordance with a predetermined line attribute determination criterion to allow for the determination of a plurality of attributes and associate with teach determination a cost value representing a measure for the validity of the determination;

(c) in response to the completion of the attribute determination for all of the lines of said document, generating a starting node and then, for the first line of said document, generating as many nodes as the number of attribute determinations of said first line, and, in accordance with a predetermined attribute-based node linking rule, linking said starting node with the nodes generated for said first line;

(d) for the next line, generating as many nodes as the number of attribute determinations of said next line and in accordance with a predetermined node linking rule based on said attributes and cost value linking through links the nodes generated for the line preceding said next line with the nodes generated for said next line, and giving costs to said generated nodes and links;

(e) sequentially performing said step (d) until reaching the last line to construct a directed graph directed from said starting node to the ending node;

(f) traveling said directed graph from said starting node while summing the costs for the nodes and links en route to find a plurality of paths reaching the ending node; and (g) ranking said plurality of paths found based on the sum of the costs associated with said individual paths.

2. A method for analyzing the logical structure of a document at set forth in claim 1 wherein said attribute determination is performed by matching with a plurality of predetermined regular retrieval patterns.

3. A method for analyzing the logical structure of a document as set forth in claim 1 wherein said step (b) further comprises a step of giving a level representing the depth of a list.

4. A method for analyzing the logical structure of a document as set forth in claim 3, comprising a step of following one path of the graph found in said step (g) and, while individually tagging in accordance with the attributes and levels of the nodes on said path, outputting a line associated with said nodes.

5. A method for analyzing the logical structure of a document as set forth in claim 4 wherein said tags are those based on the BookMaster's rule.

6. In a system for analyzing the logical structure of a document stored in readable form in a computer system in processing by said computer, a system for analyzing the logical structure of a document comprising:

(a) a memory means for storing a document in a form readable by said computer system on a line-by-line basis;

(b) a reading means for reading out said document from said memory means on a line-by-line basis;

(c) a text format analyzing means having a plurality of patterns and a pair of at least one attribute and a cost value associated with said individual patterns, having a pattern expression dictionary in which at least two or more pairs of an attribute and a cost value are associated with one pattern, and applying said plurality of patterns to the individual lines of said document read out by said reading means and in response to the occurrence of pattern matching, associating and storing all of the pairs of the attributes and cost values associated with the pattern for which said matching has occurred;

(d) a graph generating means for performing the node generation of a graph and the linking between the nodes in accordance with said attributes and cost values and previously having a rule for giving costs to said nodes and internode links, and in response to the completion of the processing for all of the lines of said document by said text format analyzing means, applying said rule from the first line of said document to link the nodes generated for the preceding line with the nodes generated for the next line, thereby generating a directed graph;

(e) a graph analyzing means for traveling said generated directed graph from the starting node until reaching the ending node while summing the costs given to said nodes and links to find a plurality of paths, and ranking said paths found based on the cost values calculated for them; and (f) a means for giving tags indicating the logical structure of the document based on said ranked paths of the graph.

7. A system for analyzing the logical structure of a document as set forth in claim 6 wherein said tags are those based on the BookMaster's rule.

8. A system for analyzing the logical structure of a document as set forth in claim 6 wherein said pattern matching includes a pattern matching based on a regular expression.

9. A system for analyzing the logical structure of a document as set forth in claim 6 wherein said attributes include the start of a list, the continuation of a list, and the attributes of an ordinary line.

10. In a method for analyzing the logical structure of a document printed on paper in a predetermined format by a computer system processing, a method for analyzing the logical structure of a document comprising the steps of:

(a) optically scanning the paper on which said document is printed, thereby to create a document image which can be processed by said computer system;

(b) analyzing said document image to determine the margins and paragraphs of the document;

(c) performing character column slicing and character recognition based on the determination of the margins and paragraphs of said document, and storing the result in a memory means in a form which can be processed by said computer system on a line-by-line basis for the document;

(d) reading said document on a line-by-line basis into the memory region of said compute system;

(e) determining attributes of line comprising the start of a list, the continuation of a list, and the attributes of an ordinary line read into said memory region in accordance with a predetermined line attribute determination criterion to allow for the determining of a plurality of attributes and associate with each determination a cost value indicating the validity of the determination;

(f) in response to the completion of the attribute determination for all of the lines of said document, generating a starting node and then, for the first line of said document, generating as many nodes as the number of the attribute determinations of said first line, and, in accordance with a predetermined attribute-based node linking rule, linking said starting node with the nodes generated for said first line;

(g) for the next line, generating as many nodes as the number of attribute determinations of said next line, and, in accordance with a predetermined node linking rule based on said attribute and cost value, linking through links the nodes generated for the line preceding said next line with the nodes generated for said next line, and giving costs to said generated nodes and links;

(h) sequentially performing said step (g) until reaching the last line to construct a directed graph directed from said starting node t the ending node;

(i) traveling said directed graph from said starting node while summing the costs for the nodes an links en route to find a plurality of paths reaching the ending node; and (j) ranking said plurality of paths found based on the sum of the costs associated with said individual paths.

11. A method for analyzing the logical structure of a document as set forth in claim 10 wherein said attribute determination is performed by matching with a plurality of predetermined regular retrieval patterns.

12. A method for analyzing the logical structure of a document as set forth in claim 10 wherein said step (b) further comprises a step of giving a level representing the depth of a list.

13. A method for analyzing the logical structure of a document as set forth in claim 12 wherein there is comprised a step for following one path of the graph found in said step (j) and, while individually tagging in accordance with the attributes and levels on said path, outputting a line associated with said nodes.

14. A method for analyzing the logical structure of a document as set forth in claim 13 wherein said tags are those based on the BookMaster's rule.

15. A method for analyzing the logical structure of a document as set forth in claim 10 wherein said step (i) further comprises a step for correcting the cost value of a node based on the margin values associated with a line of the document.

16. A method for analyzing the logical structure of a document as set forth in claim 10 wherein said step (c) further comprises a step for determining a font size for a line, and said step (i) further comprises a step for correcting the cost value of a node based on said font size associated with a line of the document.

17. In a system for analyzing the logical structure of a document printed on paper in a predetermined format by a computer system processing, a system for analyzing the logical structure of a document comprising:

(a) an image scanner means for optically scanning the paper on which said document is printed, thereby to create a document image which can be processed by said computer system;

(b) a means for analyzing said document image to determine the margins and paragraphs of the document, and storing the result in a form which can be processed by said computer system;

(c) a means for performing character column slicing and character recognition based on the determination of the margins and paragraphs of said document, and storing the result in the memory means in a form which can be processed by said computer system on a line-by-line basis for the document;

(d) a reading means for said document form said memory means on a line-by-line basis;

(e) a text format analyzing means having a plurality of patterns and a pair of at least one attribute and a cost value associated with said individual patterns, having a pattern expression dictionary in which at least tow or more pairs of an attribute and a cost value are associated with at least one pattern, and applying said plurality of patterns to the individual lines of said document read out by said reading means and, in response to the occurrence of a pattern match, associating and storing all of the pairs of attribute and cost values associated with the pattern for which said match has occurred;

(f) a graph generating means for performing the node generation of a graph and the linking between the nodes in accordance with said attributes and cost values and previously having a rule for giving costs to aid nodes and internode links, and, in response to the completion of the processing for all of the liens of said document by said text format analyzing means, applying said rule from the first line of said document to link the nodes generated for the preceding line with the nodes generated for the next line, thereby to generate a directed graph;

(g) a graph analyzing means for traveling said generated directed graph from the starting node until reaching the ending node while summing the costs given to said nodes and links to find a plurality of paths, and ranking said paths found based on the cost values calculated for them; and (h) means for giving tags indicating the logical structure of the document based on said ranked paths of the graph.

18. A system for analyzing the logical structure of a document as set forth in claim 17 wherein said tags are those based on the BookMaster's rule.

19. A system for analyzing the logical structure of a document as set forth in claim 17 wherein said pattern matching includes a pattern matching based on a regular expression.

20. A system for analyzing the logical structure of a document as set forth in claim 17 wherein said attributes include the start of a list, the continuation of a list, and the attributes of an ordinary line.

\* \* \* \* \*